(12) United States Patent
Wisnia et al.

(10) Patent No.: US 11,368,628 B2
(45) Date of Patent: Jun. 21, 2022

(54) SYSTEM FOR TRACKING A USER DURING A VIDEOTELEPHONY SESSION AND METHOD OF USE THEREOF

(71) Applicant: Light Wave Technology Inc., St-Laurent (CA)

(72) Inventors: Jack Wisnia, Dollard-des Ormeaux (CA); Feng Du, Kirkland (CA)

(*) Notice: Subject to any disclaimer, the term of this patent is extended or adjusted under 35 U.S.C. 154(b) by 0 days.

(21) Appl. No.: 17/468,055

(22) Filed: Sep. 7, 2021

(65) Prior Publication Data

US 2022/0124250 A1 Apr. 21, 2022

(30) Foreign Application Priority Data

Oct. 19, 2020 (CA) .................................. CA 3096312

(51) Int. Cl.
*H04N 5/232* (2006.01)
*H04N 5/235* (2006.01)

(52) U.S. Cl.
CPC ....... *H04N 5/23299* (2018.08); *H04N 5/2351* (2013.01); *H04N 5/23203* (2013.01); *H04N 5/23218* (2018.08); *H04N 5/23296* (2013.01)

(58) Field of Classification Search
None
See application file for complete search history.

(56) References Cited

U.S. PATENT DOCUMENTS

| | | | |
|---|---|---|---|
| 7,949,708 B2 | 5/2011 | Wang et al. | |
| 8,010,630 B2 | 8/2011 | Barreto et al. | |
| 9,116,821 B2 | 8/2015 | Scragg, Jr. et al. | |
| 9,171,221 B2 | 10/2015 | Lablans | |
| 9,294,669 B2 | 3/2016 | Glover | |
| 9,697,427 B2 | 7/2017 | Stout et al. | |
| 9,699,365 B2 | 7/2017 | Stout et al. | |
| 9,798,568 B2 | 10/2017 | Kim et al. | |
| 10,302,286 B2 | 5/2019 | Conti et al. | |
| 2002/0176603 A1 | 11/2002 | Bauer et al. | |
| 2007/0052801 A1 | 3/2007 | Shimamura | |
| 2011/0289518 A1 | 11/2011 | Li et al. | |
| 2012/0127319 A1 | 5/2012 | Rao et al. | |

(Continued)

FOREIGN PATENT DOCUMENTS

| CN | 104133711 A | 11/2014 |
|---|---|---|
| CN | 104394305 A | 3/2015 |

(Continued)

OTHER PUBLICATIONS

Corresponding Canadian Pat. Appl. No. 3,096,312 Office Action dated Jan. 15, 2021.

(Continued)

*Primary Examiner* — James M Anderson, II
(74) *Attorney, Agent, or Firm* — Anglehart et al.

(57) ABSTRACT

A method for tracking a user during a videotelephony session initiated by a videotelephony application program; it includes generating an image stream with a camera external from the smartphone or tablet; at least periodically performing image object analysis from the image stream generated by the external camera to track a position of the user within an image of the image stream; and generating a pan command and/or a tilt command to cause a pan and tilt in order to center the user in the field of view of the external camera.

18 Claims, 8 Drawing Sheets

(56) References Cited

U.S. PATENT DOCUMENTS

| 2012/0269386 | A1 | 10/2012 | Hankins et al. |
| 2013/0007317 | A1 | 1/2013 | Seo et al. |
| 2015/0097965 | A1 | 4/2015 | Stout et al. |
| 2015/0116505 | A1 | 4/2015 | Stout et al. |
| 2017/0214807 | A1 | 7/2017 | Pring |

FOREIGN PATENT DOCUMENTS

| CN | 106078670 | A | | 11/2016 | | |
| CN | 106162082 | A | | 11/2016 | | |
| CN | 106791189 | A | | 5/2017 | | |
| CN | 107465870 | A | | 12/2017 | | |
| CN | 107659768 | A | | 2/2018 | | |
| CN | 108845861 | A | | 11/2018 | | |
| CN | 110248146 | A | | 9/2019 | | |
| EP | 2696591 | A2 | | 2/2014 | | |
| KR | 20110048778 | A | | 5/2011 | | |
| WO | 2015/067023 | A1 | | 5/2015 | | |
| WO | WO-2015067023 | A1 | * | 5/2015 | ............... | H04N 7/15 |
| WO | 2019/225836 | A1 | | 11/2019 | | |
| WO | WO-2019225836 | A1 | * | 11/2019 | ............... | G06T 7/20 |
| WO | 2020/052444 | A1 | | 3/2020 | | |

OTHER PUBLICATIONS

Sani, Ardalan Amiri, et al. "Rio: A System Solution for Sharing I/O between Mobile Systems." arXiv preprint arXiv: 1312.4931 (2013).
Amiri Sani, Ardalan, et al. "I/o paravirtualization at the device file boundary." ACM SIGARCH Computer Architecture News 42.1 (2014): 319-332.
Andrus, Jeremy, et al. "Cells: a virtual mobile smartphone architecture." Proceedings of the Twenty-Third ACM Symposium on Operating Systems Principles. 2011.
Wei, Chongyu, and Luwei Zhao. "Design and implementation of a TD_SCDMA video monitoring system based on Android." Procedia Engineering 29 (2012): 1066-1070.
Patentability search materials: Apai Genie, Auto Tracking Smart Shooting Phone Holder Selfie mount Selfie stick rotate 360 degrees. Posted on May 15, 2020. https://www.youtube.com/watch?v=kBVzyV6cvCo.
Patentability search materials: Jigabot, https://www.jigabot.com/video/.
Patentability search materials: Jigabot, https://www.jigabot.com/news/.

* cited by examiner

SYSTEM FOR TRACKING A USER DURING A VIDEOTELEPHONY SESSION AND METHOD OF USE THEREOF

The present application claims priority from Canadian patent application No. 3,096,312 with a filing date of Oct. 19, 2021, incorporated herein by reference.

TECHNICAL FIELD

The present disclosure relates to videotelephony, and more particularly to tracking a user during a videotelephony session.

BACKGROUND

Videotelephony application programs have increased in popularity as a result of an increasing trend to work from home, the offering of online courses, and the drastic changes brought on by the COVID-19 pandemic.

As a variety of sessions are being offered via videotelephony, such as aerobic classes, yoga classes, disc-jockey sessions, art courses, etc., there is an increasing need to offer videotelephony software that is adapted to optimize the user experience during the course of the session.

More specifically, more sessions entail movement by the presenter and/or by the spectators. For instance, a fitness instructor may move around a room as it performs the different exercises during the course. However, many of the cameras native to tablet computers and smartphones do not have a tracking function or a pan, and/or tilt. As such, use of the videotelephony application programs do not offer a function to track a user as the user moves around a room, thereby possibly moving in and out of the field of view of the camera.

Therefore, it would be advantageous to arrive at a solution to offer a tracking function of the user during a videotelephony session such that the user remains present in the field of view of the camera during the videotelephony session despite the user moving around during the videotelephony session.

SUMMARY

The present disclosure relates to systems and methods to track a user during a videotelephony session that is being conducted on a tablet computer or a smartphone, where the user is limited by the functionality of the native camera of the tablet computer or smartphone, usually lacking a pan and tilt functionality. As such, the current native cameras of the tablet computer or smartphone are not adapted for the tracking of a user during a videotelephony session.

A first broad aspect relates to a camera unit with a pan/tilt camera having stored in its memory operating system software native to a smartphone or tablet computer. This feature allows the camera unit to download into its memory videotelephony application programs that are adapted for a tablet or smartphone that can then be run by the smartphone or tablet operating system software stored in memory of the camera unit. This configuration provides the advantage of having the videotelephony application program select for the videotelephony session, as a default camera, the pan/tilt camera that is native to the camera unit and the operating system software running on the camera unit. As such, the camera selected for the videotelephony session has pan and tilt functionality, which can be used for object tracking. This is in contrast to when the videotelephony application program is run on the smartphone or tablet itself, where the default camera selected is that of the smartphone or tablet, which usually does not have pan and tilt functionality, thereby not permitting user tracking. The running of the videotelephony application program on the camera unit is mirrored on the smartphone or tablet of the user, such that the user has access to the information of the videotelephony session. Moreover, user input provided by the user on the smartphone or tablet, such as touch input (selections on the graphical user interface of the videotelephony application program), user audio during the videotelephony session captured by a speaker of the smartphone or tablet, is transmitted to the camera unit via the mirroring. This input can be transmitted to an external server (i.e. server run by the owner or related to the owner of the videotelephony application program) such that the input can be shared with the other participants of the videotelephony session, or implemented into actions performed on the running videotelephony application program by, e.g., the operating system software of the camera unit. The camera unit also includes software for causing the tracking of a user object in the image stream generated by the pan/tilt camera of the camera unit. Pan commands and/or tilt commands are then generated to cause a pan and/or tilt of the camera in order to center the user in the field of view of the pan/tilt camera during the course of the videotelephony session, thereby maintaining the user in the frame of the graphical user interface of the videotelephony application program during the course of the videotelephony session.

In another broad aspect, the smartphone or tablet, used to run the videotelephony application program, is supported by a holder having a pan and tilt functionality. The holder includes a camera sensor configured to be attached next to the native camera of the smartphone or tablet computer. The camera sensor transmits an image stream to the holder. The holder analyzes the image stream to locate a user object of the user in the image frames of the image stream. The holder tracks the use object through the image stream. As the user object moves away from the center of the image, the holder generates pan commands and/or tilt commands to cause the holder to pan and tilt. The panning and tilting of the holder results in the user remaining in the field of view of the camera sensor of the holder, as the image stream that is used for the purposes of object tracking is the image stream generated by the camera sensor of the holder. As the holder pans and tilts, so does the smartphone or tablet computer supported by the holder. As the camera sensor of the holder is in proximity to the native camera of the smartphone or tablet computer, the panning and tilting not only results in the user remaining in the field of view of the camera sensor of the holder, but also in the field of view of the native camera of the smartphone or tablet computer used for the ongoing videotelephony application program. This allows the smartphone or tablet computer, supported by the holder that can pan and tilt, to track the movements of the user, subject to the movements of the holder, during the course of the videotelephony session.

A broad aspect is a method for tracking a user during a videotelephony session initiated by a videotelephony application program running on a smartphone or tablet of the user placed in a holder configured to pan and tilt to adjust a field of view of a native camera of the smartphone or tablet. The method includes, while a videotelephony session is running on the smartphone or tablet using the camera native to the smartphone or tablet, generating an image stream with a camera external from the smartphone or tablet, the external camera having at least an overlapping field of view to the field of view of the native camera of the smartphone or tablet; at least periodically performing image object analysis from the image stream generated by the external camera to track a position of the user within an image of the image stream; and generating at least one of a pan command and a tilt command to cause the holder to pan and tilt in order to center the user in the field of view of the external camera to maintain the user within the field of view of the native camera during the videotelephony session despite the user physically moving around during the videotelephony session.

In some embodiments, the external camera may have a wired connection with the holder, and wherein the image stream produced by the external camera is transmitted to the holder via the wired connection.

In some embodiments, the external camera may have a wireless connection with the holder, and wherein the image stream produced by the external camera is transmitted to the holder via the wireless connection.

In some embodiments, the object tracking may distinguish the object of the user from other moving objects in the image stream.

In some embodiments, the external camera may be attached to a frame of the smartphone or tablet.

In some embodiments, the method may include performing an analysis of the image stream of the external camera to identify a brightness of the image stream and adjust the brightness of the image stream to a set brightness.

In some embodiments, the method may include, prior to or at a start of the running of the videotelephony session, receiving a command from the smartphone or tablet for causing an actuator of the holder and the external camera to turn on.

In some embodiments, the object analysis may further identify actions performed by the user captured in the image stream, and determines if the user actions corresponds to a reference action to provide the user with feedback on the user action.

In some embodiments, the method may include receiving a command from the smartphone or tablet to cause at least one of the actuator of the holder to turn off and the external camera to turn off.

Another broad aspect is a method for tracking a user during a videotelephony session using a pan and tilt camera external from a smartphone or tablet such that the user is maintained within a field of view of the pan and tilt camera during the videotelephony session. The method includes, through an operating system for a smartphone or tablet stored in memory of the external pan and tilt camera, running a videotelephony application program stored in the memory of the pan and tilt camera, causing the pan and tilt camera to generate an image stream of a user appearing in the field of view of the pan and tilt camera; mirroring, through a connection between the pan and tilt camera and the smartphone or tablet, the image stream generated by the pan and tilt camera onto the camera or smartphone of the user, wherein the mirrored image stream appears on a display of the smartphone or tablet of the user;

at least periodically performing image object analysis from the image stream generated by the external camera to track a position of the user within a frame of the image stream; and generating at least one of a pan command and a tilt command to cause the pan and tilt camera to center the user in the field of view of the pan and tilt camera, such that the user is maintained in the field of view of the pan and tilt camera during the videotelephony session and in an image of the mirrored image stream appearing on the display of the smartphone or tablet.

In some embodiments, the connection between the pan and tilt camera and the smartphone or tablet may be a wireless connection.

In some embodiments, the pan and tilt camera may include a zoom function, and the method may include further generating a zoom command, along with the generating at least one of a pan command and a tilt command, to cause the pan and tilt camera to center the user in the field of view of the pan and tilt camera.

In some embodiments, the method may include receiving, through the connection, user input provided by the user on the smartphone or tablet, for controlling the videotelephony application program; and applying, through the mirroring, the user input on the videotelephony application program run by the operating system for a smartphone or tablet stored in memory of the pan and tilt camera, such that the videotelephony application program performs the one or more actions corresponding to the user input provided by the user on the smartphone or tablet.

In some embodiments, the user input may be for one or more of to show video; to hide the video; to update a background of the video; and to change a resolution of the video.

In some embodiments, the method may include, prior to the running of the videotelephony application program stored in the memory of the pan and tilt camera, receiving a command from an external camera application program running on the smartphone or tablet to cause the videotelephony application program stored in the memory of the pan and tilt camera to begin to run through the operating system for a smartphone or tablet stored in memory of the pan and tilt camera.

In some embodiments, the external camera application program running on the smartphone or tablet may provide a user with a plurality of options of possible videotelephony application programs, wherein each of the videotelephony application program selections may correspond with a videotelephony application program stored in the memory of the pan and tilt camera, and wherein the command from an external camera application program running on the smartphone or tablet may include selection information corresponding to a selection by the user of the one of the plurality of possible videotelephony application program options.

In some embodiments, one of the plurality of options of possible videotelephony application program selections may correspond to a Zoom™ application program.

In some embodiments, the generating at least one of a pan command and a tilt command to cause the pan and tilt camera may be performed by a processor of the pan and tilt camera, executing program code stored in the memory of the camera.

In some embodiments, the generating at least one of a pan command and a tilt command to cause the pan and tilt camera may be performed by a processor of the smartphone or tablet, executing program code stored in the memory of the smartphone or tablet, wherein the generated pan and tilt commands may be transmitted via the connection from the smartphone or tablet to the pan and tilt camera.

Another broad aspect is a system for tracking a user during a videotelephony session performed through a videotelephony application program running on a smartphone or tablet of the user. The system includes a camera; a fastener for fastening the camera to the tablet or smartphone in proximity to a native camera of the tablet or smartphone, such that the external camera has at least an overlapping field of view to a field of view of the native camera of the smartphone or tablet; a holder for receiving and securing a smartphone or tablet comprising: a receptacle portion for receiving and securing the smartphone or tablet, the receptacle portion adapted to pan and tilt; an actuator for causing the receptacle portion to pan and tilt; a processor; memory; program code stored in memory that, when executed by the processor, cause the processor to: transmit a command to cause the camera to generate an image stream; receive the image stream generated by the camera; at least periodically perform image object analysis from the image stream generated from the camera to track a position of the user within a frame of the image stream; generate at least one of a pan command and a tilt command to cause the holder to pan and tilt in order to center the user in the field of view of the camera; and send the at least one of a pan command and a tilt command to the actuator, for causing the actuator to correspondingly at least one of pan and tilt the receptacle portion in order to center the user in the field of view of the external camera, thereby maintaining the user within the field of view of the native camera of the smartphone or tablet during the videotelephony session despite the user physically moving around during the videotelephony session.

Another broad aspect is a pan-tilt camera system for tracking a user during a videotelephony session, wherein an image stream of the videotelephony session is viewable on a display of a smartphone or tablet of the user. The system includes a camera configured to pan and tilt; a processor; a wireless transmission for establishing a wireless connection with the smartphone or tablet; memory comprising: a native smartphone or tablet operating system; one or more videotelephony application programs configured to be run by the native smartphone or tablet operating system; program code for causing the processor, when executed by the processor to: receive input associated with starting a videotelephony session; cause the operating system to run one of the one or more videotelephony application programs, causing the camera to generate an image stream of the user appearing in the field of view of the camera; command a transmission of a mirror with information on the run one of the one or more videotelephony application programs, through the wireless connection, to the smartphone or tablet of the user, wherein the mirror incudes the image stream such that the image stream appears on a display of the smartphone or tablet; at least periodically perform image object analysis from the image stream generated by the camera to track a position of the user within a frame of the image stream; and generate at least one of a pan command and a tilt command to cause the camera to correspondingly perform at least one of a pan and tilt to center the user in the field of view of the camera, such that the user remains in the field of view of the pan and tilt camera during the videotelephony session and in a frame of an image appearing on the display of the smartphone or tablet.

In some embodiments, the camera may include a zoom function, and wherein the program code may further cause the processor, when executed by the processor, to generate a zoom command, along with the generating of at least one of a pan command and a tilt command, to cause the camera to correspondingly zoom.

In some embodiments, the program code may further cause the processor, when executed by the processor, to: receive, through the wireless connection, user input provided by the user on the smartphone or tablet, for controlling the run one of the one or more videotelephony application programs; and apply, through the mirror, the user input on the run one of the one or more videotelephony application programs, such that the run one of the one or more videotelephony application programs performs the one or more actions corresponding to the user input provided by the user on the smartphone or tablet.

In some embodiments, the one or more actions may be: to show video; to hide the video; to update a background of the video; and to change a resolution of the video.

In some embodiments, the program code may further cause the processor, when executed by the processor, to receive a command from an external camera application program running on the smartphone or tablet to cause the one of the one or more videotelephony application program stored in the memory to run through the operating system for a smartphone or tablet.

Another broad aspect is a kit for tracking a user during a videotelephony session. The kit includes the pan-tilt camera system as defined herein; and external camera application program code stored in non-transitory memory of the smartphone or tablet that, when executed by a processor of the smartphone or tablet, causes the processor of the smartphone or tablet to: receive user input to initiate the videotelephony session; generate the command to cause the one of the one or more videotelephony application programs stored in the memory of the pan-tilt camera system to run through the operating system for a smartphone or tablet stored in the memory of the pan-tilt camera system; and transmit the generated command to the pan-tilt camera system through the wireless connection.

In some embodiments, the external camera application program code when executed by a processor of the smartphone or tablet, may further cause the smartphone or tablet to: receive selection input corresponding to one of a plurality of possible videotelephony application program options, wherein each of the videotelephony application program options corresponds with one of the one or more videotelephony application programs stored in the memory of the pan and tilt camera system; wherein the generated and transmitted command includes selection information corresponding to the selection input for causing the selected one of the one or more application programs to run the native operating system of a smartphone or tablet.

In some embodiments, one of the plurality of possible videotelephony application program options may correspond to a Zoom™ application program.

BRIEF DESCRIPTION OF THE DRAWINGS

The invention will be better understood by way of the following detailed description of embodiments of the invention with reference to the appended drawings, in which.

DETAILED DESCRIPTION

Definitions

Figure 6:
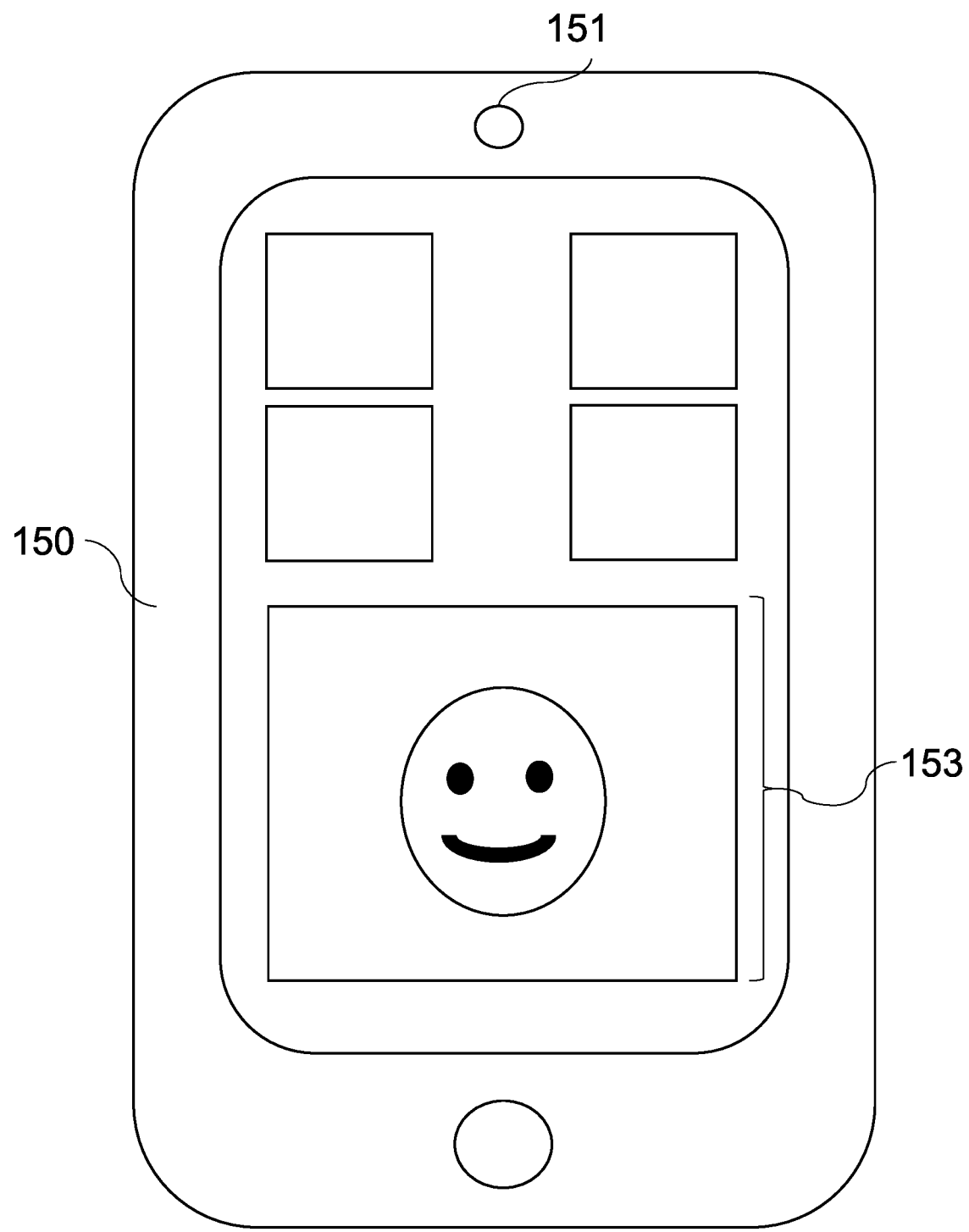
FIG. 6 is a drawing of an exemplary smartphone running a videotelephony application program displaying in the graphical user interface of the videotelephony application program, appearing on the display of the smartphone, the image corresponding to the user's image feed, and the images corresponding to the respective image feeds of the other participants.

In the present disclosure, the difference between "image" and "field of view" is that the "field of view" is the portion of the real world that is visible to the camera at a particular orientation and position of the camera in space, whereby the "image" is what is being generated by the camera at a specific point in time in the image stream, associated with the image frame, related to the virtual space. Image objects are objects that are identified in the virtual space of the image. For instance, with reference to FIG. 6, component 153 is an image, the picture of the image stream appearing on a graphical user interface of a videotelephony application program at a particular time.

present disclosure, by "telephony", it is meant remote interactions conducted between users over video, including, but not limited to, videoconferences, virtual classes such as yoga classes, school classes, university classes, artistic sessions such as disc-jockey sessions, etc. The telephony sessions may be performed using videotelephony application programs such as ZOOM™, WEBEX™, MICROSOFT TEAMS™, ABOBE CONNECT™, FACETIME™, etc.

Figure 1:
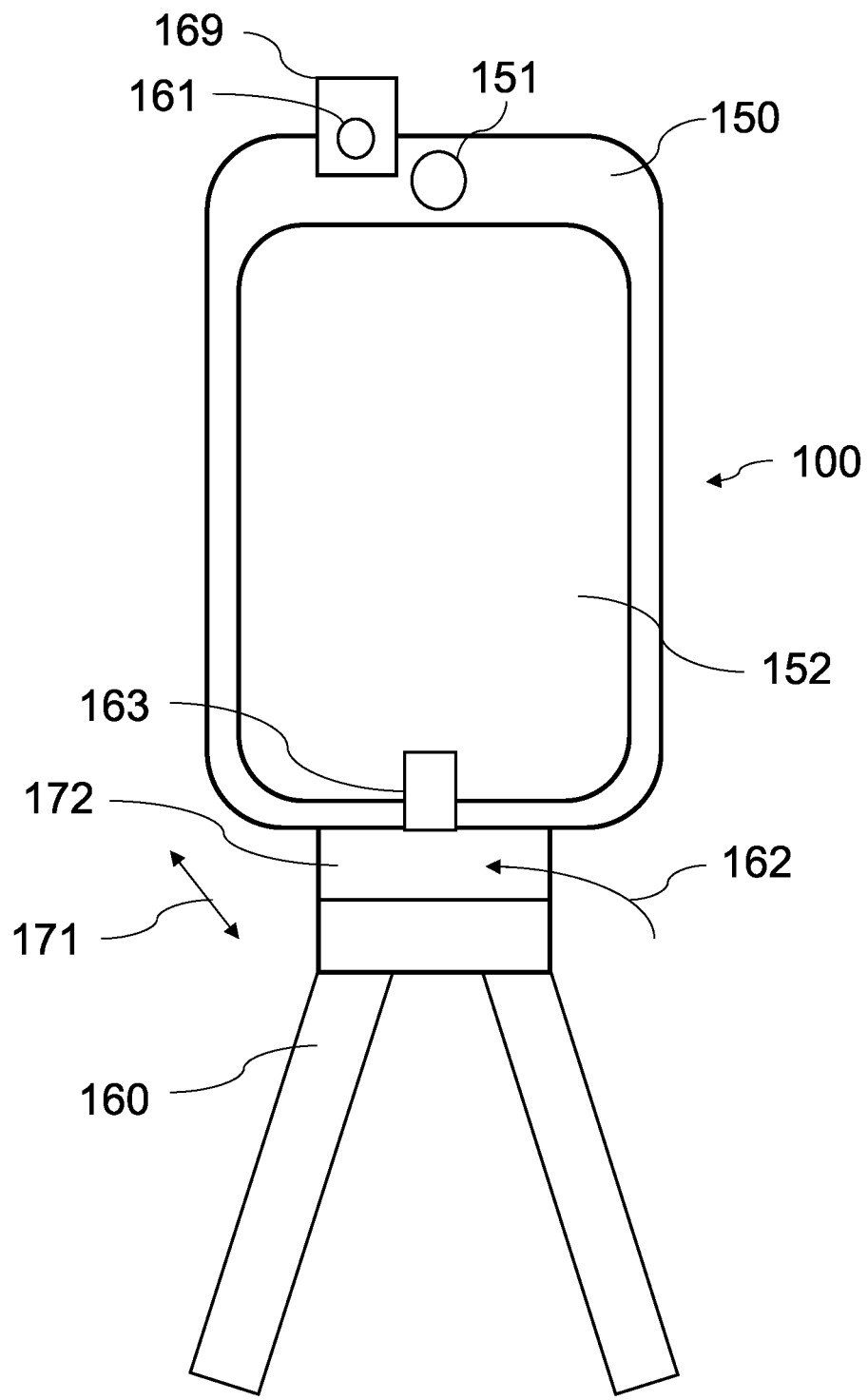
FIG. 1 is a drawing of a front view of an exemplary smartphone located in an exemplary holder offering a pan and tilt capability, including an exemplary camera sensor joined to the frame of the exemplary smartphone.

Holder for Maintaining a User in an Image of an Image Stream During a Videotelephony Session:

Reference is now made to FIG. 1, illustrating an exemplary holder 160 for receiving a computing device 150, where the holder 160 has a pan 162 and tilt 171 functionality to pan and tilt the smartphone or tablet 150 that is held by the holder 160. For purposes of illustration, the computing device 150 is a smartphone 150. However, it will be understood that the computing device 150 may also be a tablet (tablet computer) without departing from the present teachings.

The smartphone 150 has a display 152 and a native camera 151.

The holder 160 is adapted to be placed on a surface, connected to a surface or aperture (e.g. through a fastener), connected to a vertical surface such as a window (e.g. through a suction cup; screwed into a wall, etc.), can be placed on a tripod such that the received smartphone 150 may be positioned at approximately the height of a user when the tripod rests on the ground. The legs of the tripod may be adjustable.

The holder 160 includes a camera 161 that can be connected to the smartphone 150 through a fastener 169. The holder also includes a space or slot 163 for receiving and supporting the smartphone 150. The holder 160 may include one or more protrusions to maintain the smartphone 150 in the slot 163.

The holder 160 may include a portion 172 that supports the smartphone or tablet 150, and has sufficient freedom from the rest of the holder to undergo a pan and tilt, actuated by an actuator as explained herein.

The camera 161 is configured to generate an image stream. In same examples, the camera 161 is a dual camera for, e.g., providing better depth information and/or providing more information for object tracking.

The fastener 169 may be, for instance, a clip, a vice, an adhesive, an elastic, a hook, etc. The fastener 169 is connected or connectable to the camera 161.

The camera 161 is attached to the smartphone 150 in proximity of the native camera 151 of the smartphone 150, such that the field of view of the camera 161 is strongly overlapping (e.g. at least 70% correspondence between field of views) if not matching the field of view of the native camera of the smartphone 150.

Figure 2A:
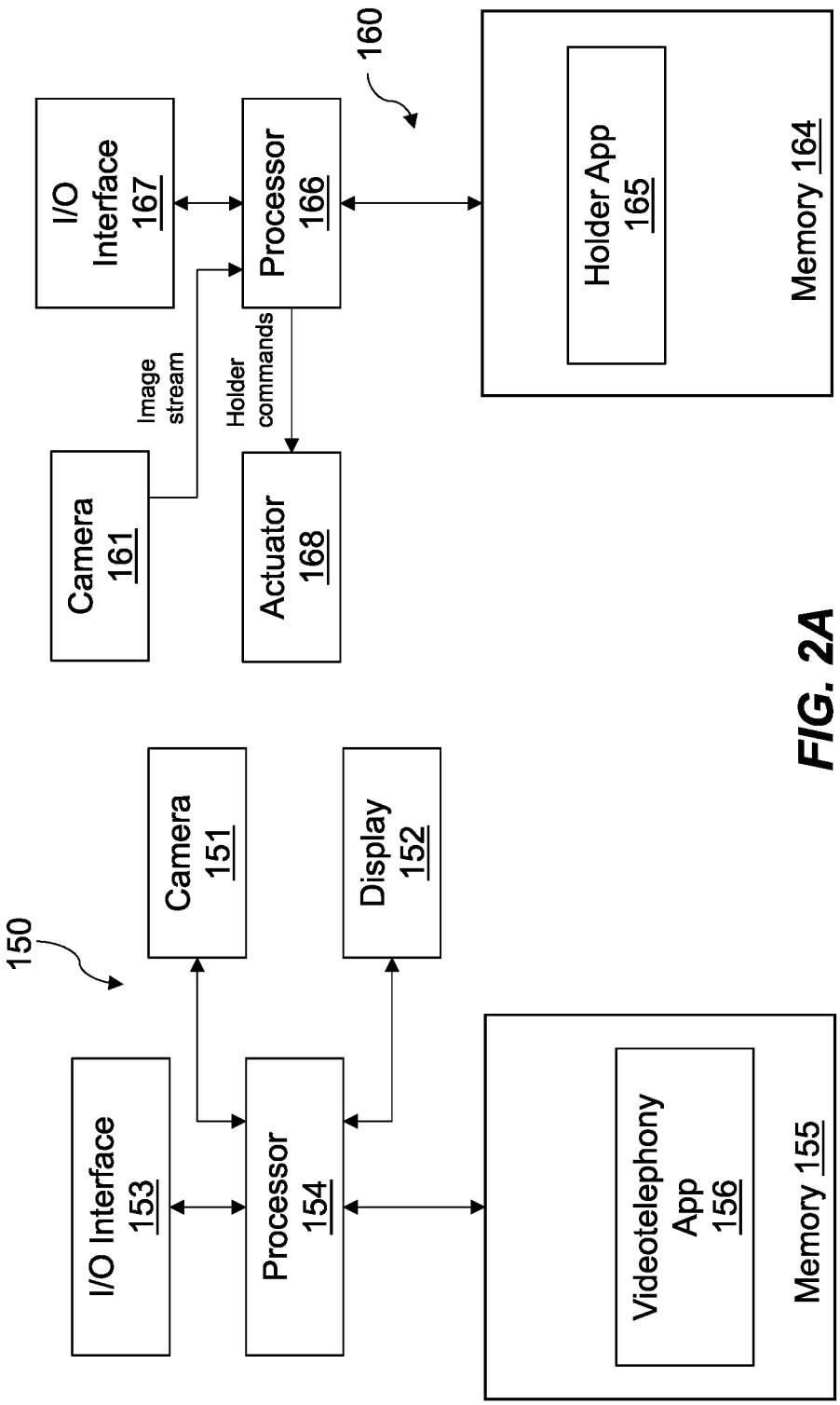
FIG. 2A is a block diagram of an exemplary system for maintaining a user in a field of view of a camera during a videotelephony session using a pan and tilt holder.
Figure 2B:
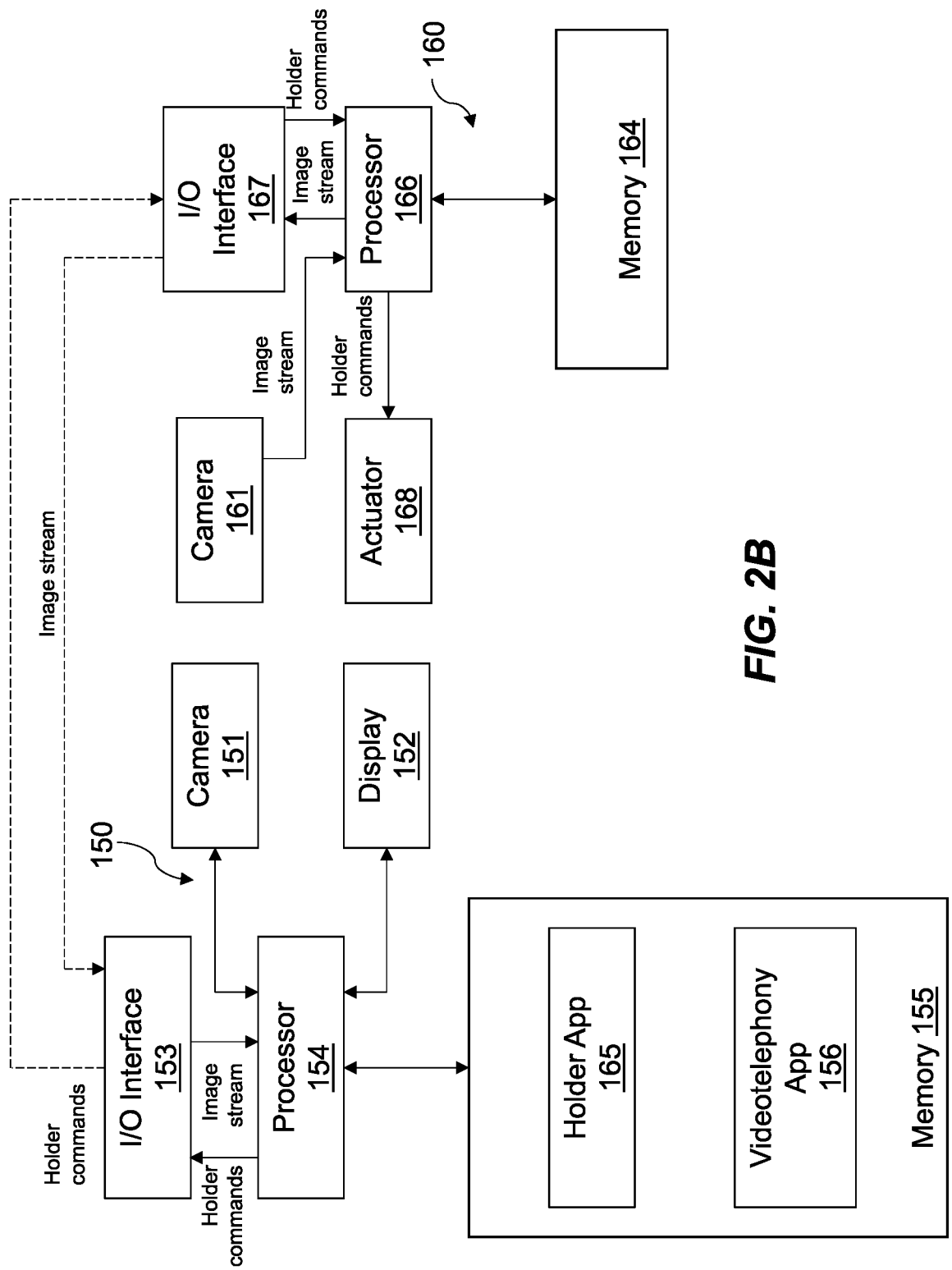
FIG. 2B is a block diagram of another exemplary system for maintaining a user in a field of view of a camera during a videotelephony session using a pan and tilt holder that receives an exemplary smartphone or tablet.

Reference is now made to FIGS. 2A and 2B, illustrating exemplary block diagrams of a system for maintaining a user within the field of view of a camera during a videotelephony session using the pan and tilt holder 160.

The holder 160 includes a processor 166, memory 164, an actuator 168, and the camera 168. The holder 160 may include an input/output interface 167 to communicate with the smartphone 150.

The processor 166 may be a general-purpose programmable processor. In this example, the processor 166 is shown as being unitary, but the processor 166 may also be multicore, or distributed (e.g. a multi-processor). The processor 166 may be a microprocessor.

The computer readable memory 164 stores program instructions and data used by the processor 166. The memory 164 may be non-transitory. The computer readable memory 164, though shown as unitary for simplicity in the present example, may comprise multiple memory modules and/or cashing. The memory stores the program code for the holder application program 165.

The I/O interface 167 is in communication with the processor 166. The I/O interface 167 is a network interface and may be a wireless interface for establishing a remote connection with, for example, the smartphone 150, a remote server, an external database, etc. For instance, the I/O interface 167 may be an Ethernet port, a WAN port, a TCP port, etc.

The actuator 168 may be pneumatic, mechanical, electrical, hydraulic, magnetic, etc., and is used to cause the panning and tilting of the portion of the holder 160 on which the smartphone 150 is located, in order to adjust the position of the smartphone 150 and its camera 151 to adjust the field of view of the camera 151 as the user moves around during the telephony session.

The I/O interface 167, actuator 168, processor 166, memory 164 may be interconnected through buses.

The hardware of the smartphone 150 is as is known in the art and includes a processor 154, an input/output interface 153, the camera 151, the display 152, memory 155.

The memory 155 stores the program code for one or more videotelephony application programs that can be run on the smartphone 150 in order to carry out a videotelephony session. The videotelephony application program 156 uses the native camera 151 for the videotelephony session.

In FIG. 2A, the holder application program 165 includes program code stored in memory 164 that, when executed by the processor 166, causes the processor 166 to send a command to the camera 161 to cause the camera 161 to begin generating an image stream. The command to generate the image stream may be sent following, for instance, the pressing of a button on the holder 160 that is associated with the beginning of a videotelephony session, or the receiving of a signal or data from the smartphone 150, received at the I/O interface 167, indicative of the start of the videotelephony session. The smartphone 150 may have program code stored in memory 155 that, when executed by the processor 154, causes the processor 154 to send the signal or data indicative of the start of the videotelephony session when a videotelephony application program 156 is run on the smartphone 150 or when a videotelephony session is begun on the smartphone 150.

The holder application program 165 includes program code stored in memory 164 that, when executed by the processor 166, causes the processor 166 to analyze the image stream generated by the camera 161 to identify an object in the image associated with the user using one or more object recognition techniques as are known in the art (e.g. background subtraction, etc.). The processor 167 then tracks the object through the image stream, the holder application program 165 including known object tracking software executed by the processor 166 to track the user object through image frames of the image stream.

The holder application program 165 includes program code stored in memory 164 that, when executed by the processor 166, causes the processor 166 to generate one or more commands to cause the panning and/or the tilting of the portion of the holder 160 supporting the smartphone 150, sent to the actuator 168. The pan and tilt commands are adapted to cause the recentering of the user in the field of view of the camera 161. As such, as the user moves during the videotelephony session, the position of the camera 161 is gradually adjusted through the panning and tilting of the holder 160 such that the user is centered in the field of view of the camera 161, the user object centered in the image of the image frame(s) of the image stream. As the camera 151 is in proximity to camera 161, the centering of the user in the field of view of the camera 161 results in the user remaining in the field of view of camera 151 that is used for the videotelephony session even if the user moves during the videotelephony session.

As shown in FIG. 2B, the holder application program 165 may instead be stored in the memory 155 of the smartphone 150. In this example, the I/O interface 167 of the holder 160 may transmit the image stream generated by the camera 161 to the I/O interface of the smartphone 150.

In this example, the holder application program 165 includes program code stored in memory 155 that, when executed by the processor 154, causes the processor 154 to perform the analysis of the image stream produced by camera 161 for object recognition and object tracking as explained herein with respect to FIG. 2A. The processor 154 then generates the pan commands and/or tilt commands to center the user object in the field of view of camera 161, and causes the transmission of the pan commands and/or tilt commands to the I/O interface 167 of the holder 160 via the I/O interface 153.

In this example, the processor 166 then transmits the received pan commands and/or tilt commands to the actuator 168, causing the actuator 168 to perform the pan and tilt corresponding to the pan commands and/or tilt commands, thereby recentering the user object in the field of view of the camera 161, and maintaining the user in the field of view of camera 151 using for the videotelephony session.

Figure 3:
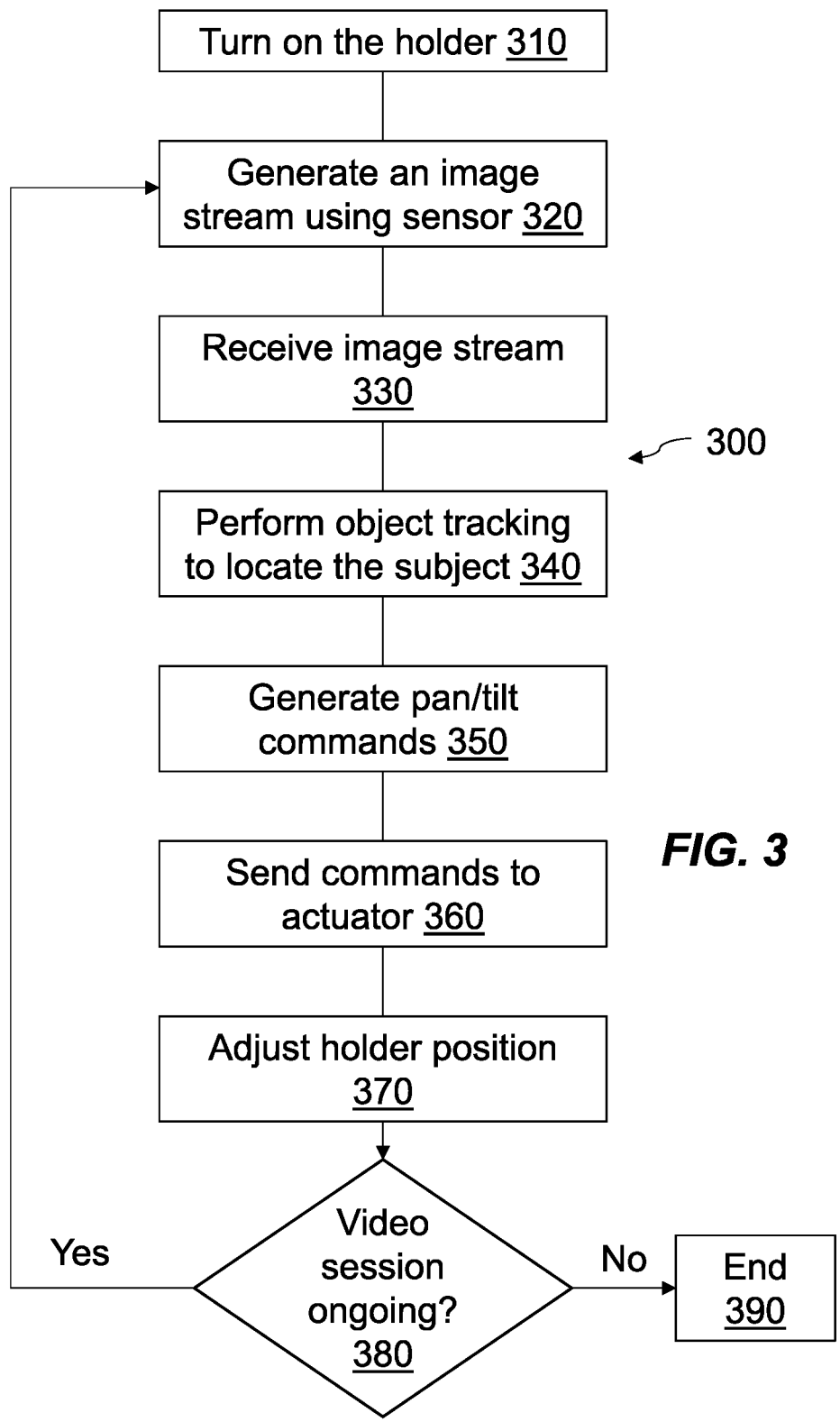
FIG. 3 is a flowchart diagram of an exemplary method for maintaining a user in a field of view of a camera during a videotelephony session using a pan and tilt holder that receives an exemplary smartphone or tablet.

Exemplary Method of Maintaining a User within a Field of View of a Camera of a Smartphone or Tablet During a Videotelephony Session Using a Pan and Tilt Holder:

Reference is now made to FIG. 3, illustrating an exemplary method 300 of maintaining a user within a field of view of a camera during a videotelephony session using a pan and tilt camera. For the purpose of illustration, reference will be made to smartphone 150 and holder 160. However, it will be understood that any suitable computing device (e.g. smartphone; tablet) may be used, and any holder in accordance with the present teachings may be used.

The holder 160, including the camera 161, may be turned on at step 310. The user may press a button on the holder 160 causing the holder 160 to turn on. In some embodiments, the smartphone 150 may include an application program for causing the holder 160 to turn on, where the user may provide input through the application program to cause the sending of a command to turn on the holder 160 through a connection between the smartphone 150 and the holder 160, the command received through I/O interface 167. In some embodiments, a background application program running on the smartphone 150 may monitor for the running of one or more videotelephony application programs stored on the smartphone 150, where, upon detection of the running of a videotelephony application program 156, or of the start of a videotelephony session (e.g. by monitoring the camera 151), and may cause the generating and sending of a command to the I/O interface 167 of the holder 160 to cause the holder 160 to turn on, or switch from a "sleep" mode to an "on" mode, after the holder 160 has processed the received command.

The holder application program 165 causes the processor 166 to send a command to the camera 161 to cause the camera 161 to begin generating an image stream at step 320, thereby producing an image stream that is similar if not identical to the image stream generated by camera 151 of the smartphone 150.

The processor 166 then receives the image stream at step 340.

The holder application program 165 causes the processor 166 to perform object analysis to identify the user in the image of the image stream using, e.g., known object analysis techniques, such as background subtraction, to identify an object corresponding to the user in the image. The holder application program 165 causes the processor 166 to perform object tracking of the user object in the image stream at step 340.

As the user object moves in the image from frame to frame of the image stream, the user object moving away from the center of the image, the holder application program 165 causes the processor 166 to generate pan command(s) and/or tilt command(s) for altering the position of the holder portion supporting the smartphone 150, and thereby the camera 161 generating the image stream being analyzed by holder application program 165 that is attached to the smartphone 150.

The pan command(s) and/or tilt command(s) are transmitted by the processor 166 to the actuator 168 at step 360. The actuator 168 carries out the commands, resulting in panning and/or tilting, that corresponds to the pan command(s) and/or tilt command(s), of the holder portion 160 that supports the smartphone 150, causing the smartphone 150, and the camera 161 attached thereto, to move correspondingly. This results in a pan and/or tilt of the camera 161, adjusting the field of view of the camera 161 to recenter on the user.

As such, the camera 161 is used as a sensor to identify the location of the user and to provide information to the holder 160 to regularly adjust the position of the portion of the holder 160 supporting the smartphone 150 to track the user.

As the camera 161 is positioned in proximity to the native camera 151 of the smartphone 150 that is being used for the videotelephony session, the recentering of the user in the field of view of the camera 161 through the movements of the holder portion supporting the smartphone 150, also results in the user remaining in the field of view of the camera 151 (e.g. at least close to the center of the field of view of camera 151) during the videotelephony sessions, despite the moving of the user throughout the videotelephony session. Therefore, the user remains visible to the other participants of the videotelephony session, despite the movement of the user.

If the video session is ongoing at step 380, steps 320 to 370 continue to be carried out, where the camera 161 continues to generate an image stream that is further analyzed to track the user, where pan command(s) and/or tilt command(s) are generated and transmitted to the actuator 168 to adjust the position of the camera 161 (and also camera 151) such that the user remains centered in the field of view of camera 161.

If the video session has ended at step 380, the user tracking ends at step 390, where the camera 161 may stop generating the image stream. The holder 160 may then turn off or return to a "sleep" mode.

Figure 4:
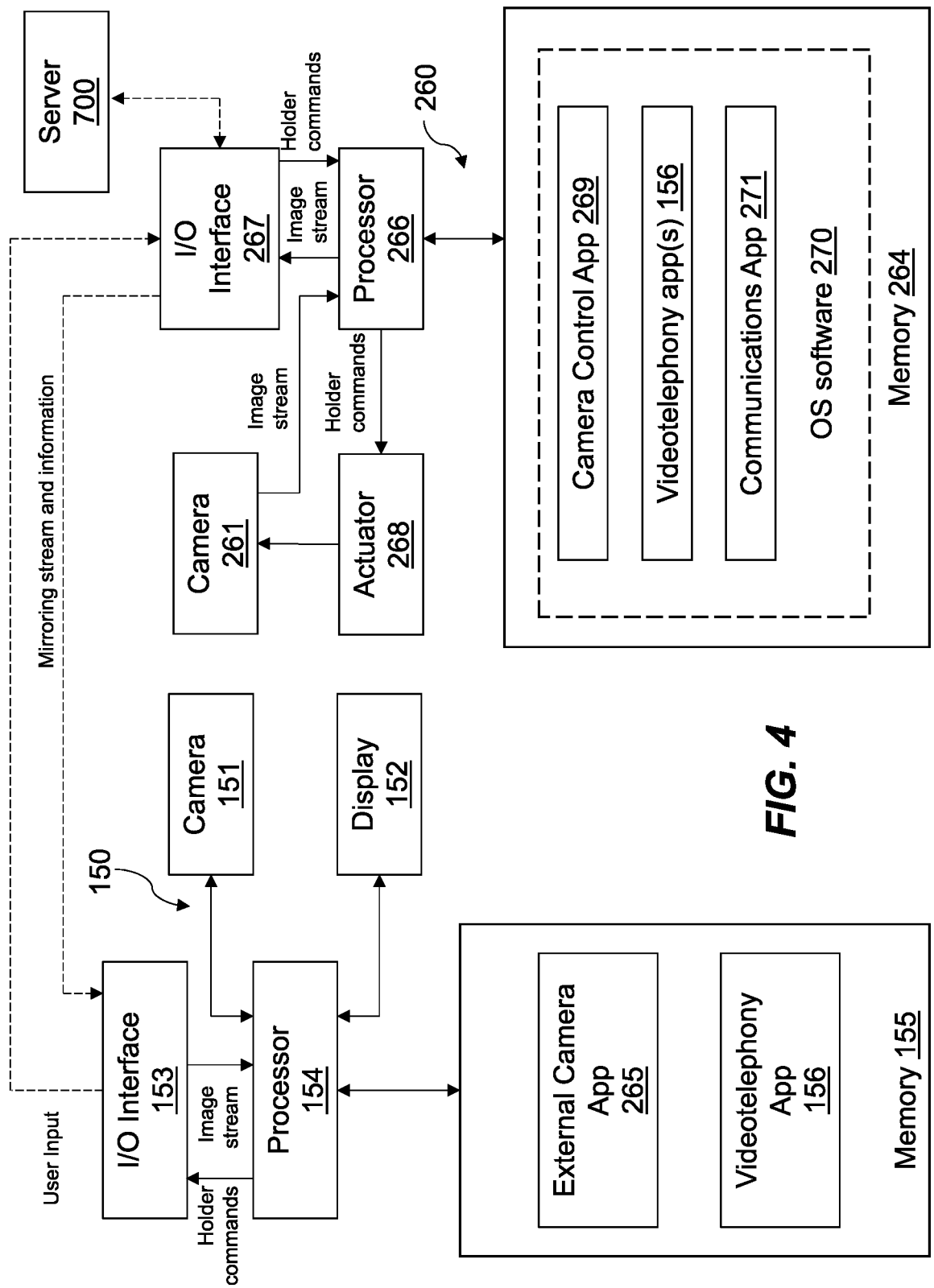
FIG. 4 is a block diagram of an exemplary system for maintaining a user in a field of view of a pan-tilt camera used for a videotelephony session.

Exemplary System for Maintaining a User within a Field of View of a Tracking Camera During a Videotelephony Session:

Reference is now made to FIG. 4, illustrating an exemplary system for maintaining a user within a field of view of a tracking camera used during a videotelephony session. The system includes a tracking camera unit 260 and the smartphone 150.

In the example of FIG. 4, the tracking camera unit 260 provides the image stream for the purposes of the videotelephony session.

The tracking camera unit 260 includes the camera 261 that is configured to pan and tilt, an actuator 268 for controlling the mechanism to pan and tilt the camera 261, a processor 266, memory 264 and an input/output interface 267.

The camera 261 generates an image stream, the image stream used for the videotelephony session as explained herein. The camera 261 may also have a zoom capability. In some examples, the camera 261 is a dual-camera for, e.g., providing better depth information and/or providing more information for object tracking.

The actuator 268 may be pneumatic, mechanical, electrical, hydraulic, magnetic, etc. and is used to cause the panning and tilting of the camera 261, in order to adjust the field of view of the camera 261 as the user moves around during the telephony session.

The processor 266 may be a general-purpose programmable processor. In this example, the processor 266 is shown as being unitary, but the processor may also be multicore, or distributed (e.g. a multi-processor). The processor 266 may be a microprocessor.

The computer readable memory 264 stores program instructions and data used by the processor 266. The memory 264 may be non-transitory. The computer readable memory 264, though shown as unitary for simplicity in the present example, may comprise multiple memory modules and/or cashing. In particular, it may comprise several layers of memory such as a hard drive, external drive (e.g. SD card storage) or the like and a faster and smaller RAM module. The RAM module may store data and/or program code currently being, recently being or soon to be processed by the processor 266 as well as cache data and/or program code from a hard drive. A hard drive may store program code and be accessed to retrieve such code for execution by the processor 266 and may be accessed by the processor 266 to store, image object data structures, image data, gesture information to be recognized in the image stream, etc. The memory 264 may have a recycling architecture for storing, for instance, image information, etc., where older data files are deleted when the memory 264 is full or near being full, or after the older data files have been stored in memory 264 for a certain time. The memory 264 stores the program code for the camera control application program 269, native operating system software 270 of a smartphone or tablet, one or more videotelephony application programs 156 than can be run by the OS software 270, and a communications application program 271.

The I/O interface 267 is in communication with the processor 266. The I/O interface 267 is a network interface and may be a wireless interface for establishing a remote connection with, for example, the smartphone 150, a remote server 700, an external database, etc. For instance, the I/O interface 267 may be an Ethernet port, a WAN port, a TCP port, etc. The I/O interface can also establish a connection (e.g. via a wireless connection) with an external server 700 hosted by or associated to the owner of the videotelephony application program for allowing a videotelephony session to take place.

The I/O interface 267, actuator 268, processor 266, memory 264 may be interconnected through buses.

The camera control application program 269 includes program code stored in memory 264 that, when executed by the processor 266, causes the processor 266 to receive the image stream generated by the camera 261, perform image analysis of the image stream generated by the camera 261 to identify an object in the image corresponding to the user using object analysis techniques as are known in the art such as background subtraction.

The camera control application program 269 also includes program code stored in memory 264 that, when executed by the processor 266, causes the processor 266 to perform object tracking of the user object through the frames of the image stream. The camera control application program 269 then causes the processor to generate pan commands and/or tilt commands transmitted to the actuator 268 to cause the camera 261 to undergo a corresponding pan and/or tilt, in order to recenter the user in the field of view of the camera 261. As such, the camera control application program 269 is configured to ensure that the user remains in the field of view of the camera 261.

The operating system software 270 stored in the memory 264 causes the processor 266, when executed by the processor 266, to perform the functions and processes of a native operative system that is found on a smartphone or tablet. The operating system software 270 permits the running of videotelephony application programs 156 that would normally be found on a smartphone or tablet. Moreover, the operating system software 270 may also include program code that can allow for the downloading onto memory 264 of the camera unit 260 of application programs that are configured for a smartphone or a tablet, such as further videotelephony application programs 156.

The videotelephony application programs 156 are stored in memory 264 and can be run by the operating system software 270 also stored in memory 264. As such, upon receiving information to start a videotelephony session as explained herein, the videotelephony application program 156 is run by the operating system software stored in memory 264 of the camera unit 260, thereby performing the videotelephony session on the camera unit 260. The running of the videotelephony application program 156 on the operating system software stored in memory 264 of the camera unit 260 results in the selection of camera 261, with a pan and tilt functionality, as being the camera for the purpose of the videotelephony session, and not the native camera of the smartphone 150 that may not have a pan and tilt functionality.

The communications application program 271, or the operating system software 270 itself (e.g. SCREEN CASE™ offered by the Android operating system), includes program code stored in memory 264 that, when executed by the processor 266, causes the processor 266 to share a mirroring of the operating system, including the run videotelephony application program 156 with the smartphone 160 via the I/O interface 267. The communication application program 271 also causes the processor 266 to receive information and commands from the smartphone 150 sent to the I/O interface 267, generated by the external camera application program 265 stored in the memory 155 of the smartphone 150.

The mirroring generated by communications application program 271 includes image information on what would appear on a display of a computing device if the operating system were to be run on the operating system, sound information associated with the videotelephony session, etc.

The server 700 is maintained by or is associated to the owner of the videotelephony application program 156, to manage the data for running a videotelephony session.

The smartphone 150 includes the processor 154, the memory 155, display 152, camera 151 and an I/O interface 153.

The external camera application program 265 is stored in the memory 155 of the smartphone 150. The external camera application program 265 includes program code that, when executed by the processor 154, causes the processor 154 to receive the mirroring stream generated by the communications application program 271. The image stream of the mirroring stream is then displayed on the display 152, such that the user can view the videotelephony session as being conducted by the videotelephony application program 156 that is run on the camera unit 260. The audio stream of the mirrored stream, with the sound of the videotelephony session, is transmitted to the speakers of the smartphone 150 in order to allow the user to hear the audio associated with the videotelephony session that is being conducted by the videotelephony application program 156 that is run on the camera unit 260.

The external camera application program 265 includes program code that, when executed by the processor 154, causes the processor 154 to receive user input provided by the user on the smartphone 150 associated with the videotelephony session (e.g. turn on or turn off the audio; turn on or turn off the video; change the background, etc.) The external camera application program 265 then causes the processor 154 to transmit the received input to the camera unit 260 via the mirroring, such that the communications application program 271 can implement the actions on the videotelephony application program 156 that is being run on the camera unit 260, through processor 266, corresponding to the received input. When the user input is audio received in the microphone of the smartphone 150, the external camera application program 265 may cause the audio data to be transmitted to the camera unit 261, the audio data processed by the operating system software 270 to be received by the videotelephony application program, the audio information then transmitted via I/O interface 167 to the remote server 700 such that the audio from the user may be shared with the other participants. In some embodiments, the camera unit 260 may include, or be connected to, a microphone, to capture the audio of the user or of the surroundings for the purpose of incorporating the audio into the videotelephony session.

Figure 7:
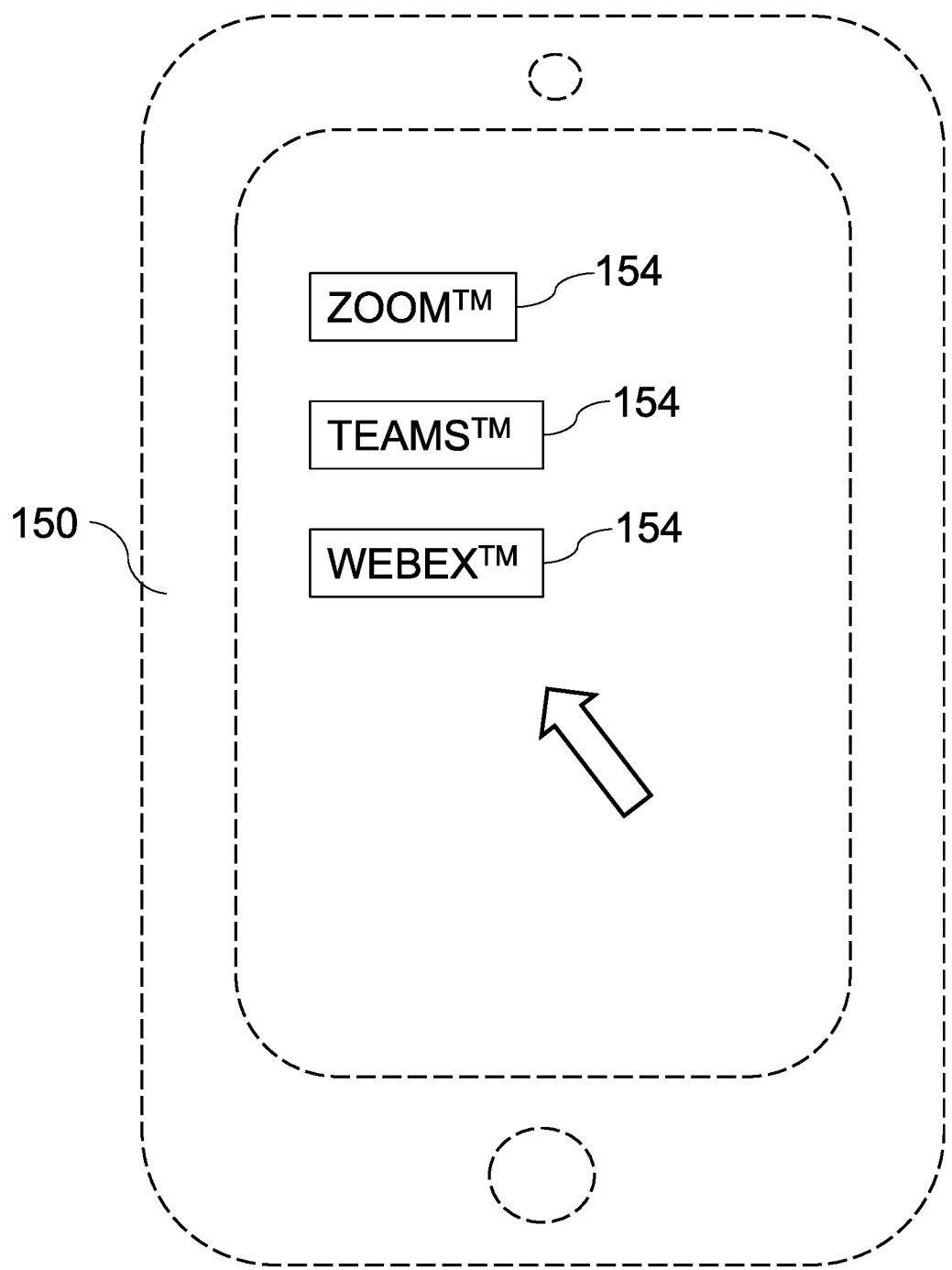
FIG. 7 is a drawing of an exemplary smartphone running an exemplary external application program displaying an exemplary graphical user interface of the external application program showing a selection of possible videoconferencing application program options for enabling videotelephony.

The external camera application program 265 may also include program code that, when executed by the processor 154, causes the processor 154 to generate a graphical user interface, as shown in the example of FIG. 7, where the user may select a videotelephony application program to run, by selecting one of the videotelephony application program options 154 offered on the graphical user display of the external camera application program 265. The videotelephony application program options 154 correspond to the videotelephony application programs 156 stored in memory 264 of the camera unit 260, that can be run by the operating system software 270.

Once the user selects one of the videotelephony application program options 154, the external camera application program 265 causes the processor 154 to generate and transmit (via I/O interface 153) a command to cause the operating system 270 (e.g. through communications application program 271) to run on camera unit 260 the videotelephony application program 156 associated with the user's selection.

Memory 155 of the smartphone 150 may also include one or more videotelephony application programs 156, where the user may run one of the videotelephony application programs 156 stored in the memory 155 of the smartphone 150 directly through the smartphone 150. However, in this case, the unit may not benefit from the pan and tilt functionality of camera unit 260, as the videotelephony application program 156 run on the smartphone 150 may select the camera 151 that is native to the smartphone 150. In some examples, a videotelephony application program 156 may provide a user with an option to select amongst multiple camera accessories that are compatible with the computing device. However, such camera options may result in certain shortcomings that are remedied by the present disclosure. For instance, videotelephony application program 156 may require that the image stream be sent to and processed by a server of the videotelephony application program 156 to be analyzed for object tracking, thereby increasing resource consumption and create privacy issues with the image stream. Instead, in the present disclosure, the object tracking is performed by software found in the camera unit 260, therefore not requiring a remote server for the object tracking. Moreover, a videotelephony application program 156 with camera selection options may only be compatible with certain computing devices (e.g. not with certain smartphones) and certain operating systems (e.g. there may be certain permission restrictions with an iOS). However, in the teachings of the present disclosure, as the software to run the pan and tilt camera as well as the videotelephony application program is found on the tracking camera itself, this arrangement avoids compatibility issues present depending on the nature of the computing device being used for the videotelephony session.

As shown in FIG. 4, a connection is established between the smartphone 150 and the camera unit 260 (i.e. between I/O interface 153 and I/O interface 267). The connection may be a wireless connection (e.g. Internet of LAN connection), or a wired connection. The connection allows for the transmission of data associated with the mirroring to and from the smartphone 150 and the camera unit 260, including the user input provided by the user on the smartphone 150 associated with the videotelephony session, as well as commands for starting the videotelephony session following the receipt of corresponding input from the user on the graphical user interface (e.g. FIG. 7) of the external camera application program 265 running on the smartphone 150.

Figure 5:
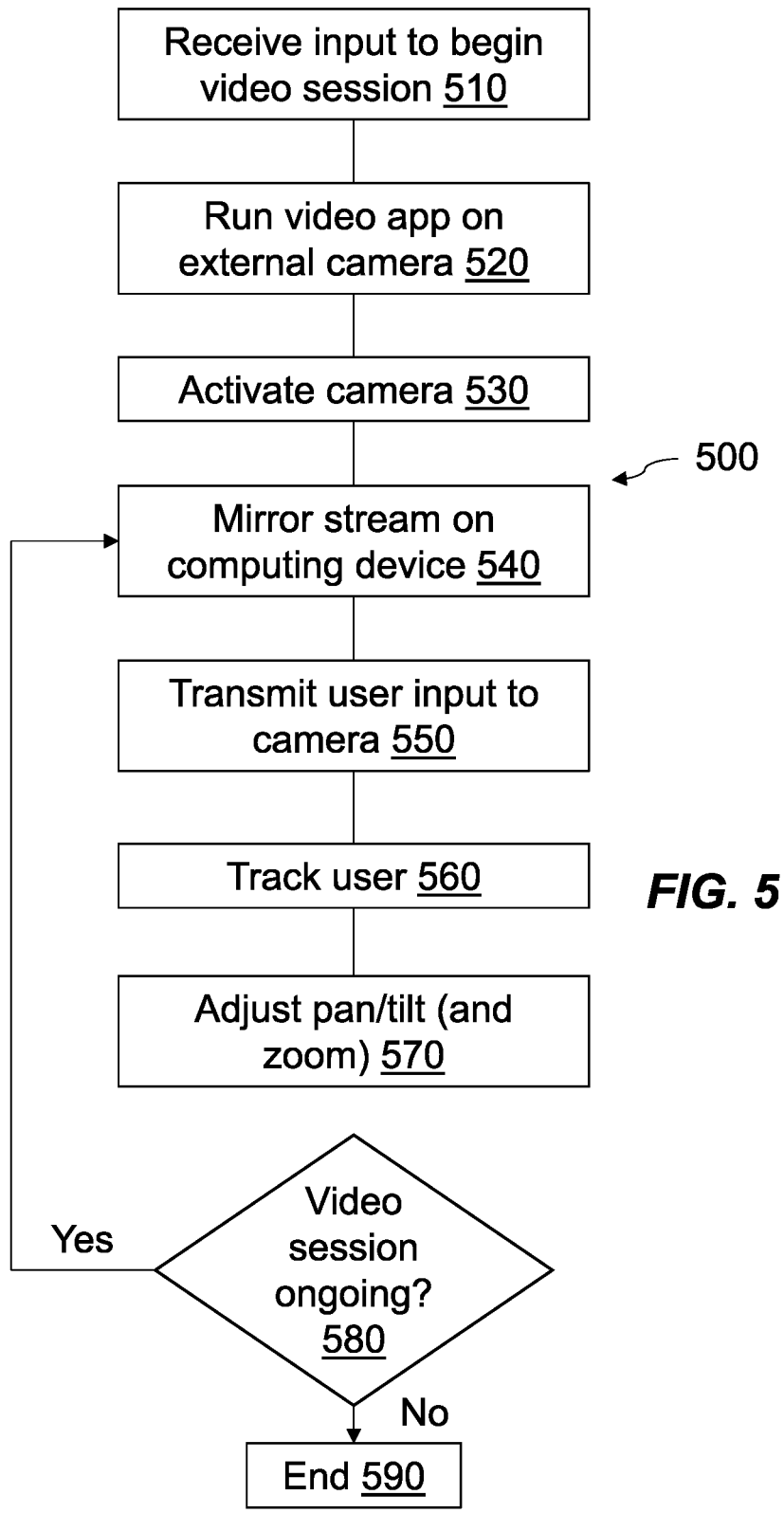
FIG. 5 is a flowchart diagram of an exemplary method for maintaining a user in a field of view of a pan-tilt camera used for a videotelephony session.

Exemplary Method for Maintaining a User within a Field of View of a Camera with a Pan and Tilt Capability During a Videotelephony Session:

Reference is now made to FIG. 5, illustrating an exemplary method 500 of maintaining a user within a field of view of camera having pan and tilt capability during a videotelephony session that is viewable on a smartphone of the user. For the purpose of illustration, reference will be made to smartphone 150 and camera unit 260. However, it will be understood that any suitable computing device (e.g. smartphone; tablet) may be used, and any camera unit in accordance with the present teachings may be used.

The camera unit 260 receives input to begin the video session at step 510. The input may be a command sent from the smartphone 150. The command may be generated (e.g. generated by the processor 164 executing the program code of the external camera application program 265) following the providing of input by the user using the external camera application program 265, (e.g. running the external camera application program 265; providing input on the graphical user interface of the external camera application program 265, such as selecting an option to start the videotelephony session or the selection of a videotelephony application program option 154 appearing on the displayed graphical user interface of the external camera application program 265).

In some embodiments, the input to begin the videotelephony session may be the pressing of a button on the camera unit 260, the button associated with the beginning of a videotelephony session.

Following the receipt of the input to begin the session, where the input may be received and analyzed by the processor 266 executing the program code of the communications application program 271, the operating system software 270 stored in memory 264 of the camera unit 270 is prompted to run the videotelephony application program 156 at step 520. If multiple videotelephony application programs 156 are stored in memory 264, the videotelephony application program 156 corresponding to the input (e.g. may include selection information on the videotelephony application program 156 to run as explained herein) starts to run.

The running of the videotelephony application program 156 causes the videotelephony application program 156 to turn on, or to take out of "sleep" mode, the pan/tilt camera 261 and/or to cause the generating of an image stream at step 530, as the pan/tilt camera 261 is the native camera of the operating system software 270 running on the camera unit 260. As such, by having the OS software running on the camera unit 260 instead of on the smartphone 150, this avoids the possibility that the videotelephony application program would select the camera 151 of the smartphone 150 as the camera 150 to be used for the videotelephony session, the camera 151 not having pan and tilt capabilities. The present configuration enables the user to benefit from a camera that can pan and tilt during the videotelephony session.

A mirror of the information associated with the running videotelephony application program 156 is then generated at step 540. In some embodiments, the communications application program 271 may cause the processor 266 to generate a mirror of the information associated with the running videotelephony application program 156 (e.g. image stream of the graphical user interface of the running videotelephony application program 156, audio stream, etc.) at step 540. In some examples, the mirroring may be initiated by the operating system software 270, having a mirroring functionality. The mirrored information is transmitted to the smartphone 150 via the connection established between the I/O interface 153 and the I/O interface 267. The I/O interface 163 receives the mirrored data. The external camera application program 265 running on the smartphone 150 may cause the processor 154 to process the mirrored data to generate a mirrored version, on display 152, of the graphical user interface of the videotelephony application program 156 that is running on the camera unit 260. A videotelephony application program 156 is not running on the smartphone 150. Instead, the external camera application program 265 causes a mirror of the graphical user interface of the videotelephony application program 156 that is running on the camera unit 260 to appear on the display 152 of the smartphone 150.

As the mirrored graphical user interface of the videotelephony application program 156 that is running on the camera unit 260 appears on display 152 of the smartphone 150, the user may provide input corresponding to actions to be carried out by the running videotelephony application program 156, e.g. using the touchscreen of the display 152. The user input is transmitted to the camera unit 260 via the connection between the I/O interface 153 and the I/O interface 267 (e.g. by the processor 154 carrying out the instructions of the external camera application program 265 running on smartphone 150) at step 550.

The camera unit 260 receives the user input at the communications application program 271. The communications application program 271 causes the processor 266 to perform the action(s) in the run videotelephony application program 156 (e.g. turn on the video feed; turn off the video feed; turn on the sound; turn off the sound; add a specific background, type a message in the chat) corresponding to the user input.

For instance, if the running videotelephony application program 156 is the ZOOM™ application program, the user may select, on the graphical user interface of the running ZOOM™ application program being mirrored on display 152 of the smartphone 150, an icon from the graphical user interface of the running ZOOM™ application program. The user input information (e.g. touchscreen coordinates, time, nature, etc.) is transferred to the camera unit 260. As a result of the mirroring, the communications application program 271 analyzes the user input and determines that the action corresponds with pressing the mic icon on the graphical user interface of the ZOOM™ application program, resulting in the user being muted. The communications application program 271 then generates a command to the operating system software 270 to cause the ZOOM™ application program to create the same input to cause the muting of the user.

The user input may also include the user's audio, captured by a speaker of the smartphone 150. The audio may also be shared with the camera unit 260 through by the external camera application program 265 through the connection established between I/O interface 153 and the I/O interface 267, and transmitted to the videotelephony application program 156 running on the camera unit 260, via the communications application program 271. As such, the audio of the user may be shared with the other participants of the videotelephony session, now transmitted to the running videotelephony application program 156 e.g., through I/O interface 267. The user audio, the image stream generated by camera 261, and any other useful information for the videotelephony session, may be transmitted to the external server 700 of the videotelephony application program 156.

The user is then tracked in the image stream of the camera 261 at step 560. For instance, the camera control application program 269 analyzes the image stream to define an image object associated with the user in the frames of the image stream using image analysis techniques as are known in the art.

The camera control application program 269 then causes the processor 266 to track the user object in the frames of the image stream using object tracking software as is known in the art (e.g. using corner matching of the image object).

The camera control application program 269 then causes the processor 266 based on the centering of the user object in the image of the images frames of the image stream to generate pan commands and/or tilt commands to cause the camera 261 to undergo a pan and/or tilt correspondingly. The pan commands and/or tilt commands are to adjust the pan and/or tilt of the camera 261 at step 570, centering the user in the field of view of the camera 261, thereby resulting in the camera 261 tracking the user as the user moves around the videotelephony session.

In some embodiments, where the camera 261 has an adjustable zoom, the camera control application program 269 causes the processor 266 to generate zoom commands to adjust the zoom of the camera 261 (e.g. increase the zoom when the user moves away from the camera—e.g. measuring a decrease in size in the user object in consecutive frames of the image frame; decrease the zoom as the user moves towards the camera 261—e.g. measuring an increase in size in the user object in consecutive frames of the image stream).

If the videotelephony session is ongoing at step 580, the steps 540-570 may be repeated, where the mirroring of the videotelephony application program 156 running on the camera unit 260 continues during the videotelephony session, the camera unit 360 may continue to receive user input provided on the smartphone 150, and the user continues to be tracked by the camera 261 through image analysis and periodic generation of pan commands and/or tilt commands and/or zoom commands.

If the videotelephony session is no longer ongoing at step 580 (e.g. input received from the user to end the videotelephony session), the videotelephony application program 156 is closed by the operating system software 270, and the camera 261 may cease generating an image stream.

User input indicative that the videotelephony session has ended may be, for instance, the pressing of a button on the camera unit 260 associated with turning off the camera unit 260, the selecting of a button on the external camera application program 265 for ending the videotelephony session, etc.

Image Analysis Applications During the Videotelephony Session:

With respect to the embodiments including the holder (e.g. holder 160) or embodiments including the camera unit (e.g. camera unit 260), the image stream generated by the camera 161 or the image stream generated by the camera 261 may be the subject to further image analysis for the purpose of improving the user experience during the videotelephony session. For the following examples, the computing device may also be a desktop computer, a laptop computer, provided that the camera used for the videotelephony session has a pan/tilt functionality.

In some embodiments, object analysis may be further performed on the image stream to identify specific gestures of the user, where the gestures may be associated with specific actions to be carried out during the videotelephony session, where the gestures can be translated to actions performed on the videotelephony application program. In the example of the holder 160, a further application program may be stored in memory 164 that, when executed by the processor 166, causes the processor 166 to perform image analysis to identify the gestures using image analysis techniques that are known in the art. Upon identifying a gesture in the image stream by, e.g., comparing to a database of gesture object data structures, a command to perform the corresponding action, or input to cause the action, on the smartphone 150 that is running the videotelephony application program 156 is generated and transmitted to, e.g., the smartphone 150, processed by a background application program running on the smartphone. The command may be a sequence of keyboard commands to cause the smartphone 150 to, upon reception and processing by the operating system of the smartphone 150, carry out the action on the running videotelephony application program 156 corresponding to the user gesture.

In the example of the camera unit 261, as the videotelephony application program 156 for the videotelephony session is run by the operating system software 270 located in the memory 264 of the camera unit 261, upon detection of the gesture through image analysis of the image stream, e.g. camera control application program, or another application program stored in memory 264, may cause the processor 266 to perform the action, e.g., through the operating system software 270, on the videotelephony application program 156, or by the videotelephony application program 156, that corresponds to the gesture (e.g. generating input to cause the action when the input is received by the videotelephony application program 156).

Exemplary user gestures may be, for instance, a palm of a hand raised above the head to trigger the generating of an icon of a hand to appear in the image of the user appearing in the graphical user interface of the videotelephony application program 156, indicative that the user has a question; two hands in the air for a certain period to cause the videotelephony application program to mute the audio; a pinch gesture to zoom in or to zoom out; etc.

In some embodiments, the image analysis may be performed to provide the user with corrective information on its performance during the course of the videotelephony session. This feature may be implemented when the user is taking a virtual class, such as a sports class (e.g. cycling; Zumba; martial arts; dance; aerobics; etc.), a yoga class, an arts class, etc.

For instance, through image analysis, the application program may cause the processor to monitor the posture and anatomy of the user in the image stream (e.g. to provide the user with feedback of if it is performing certain exercises correctly during the course of a virtual course, such as a virtual exercise course). The application program may then cause the processor to identify the relative change in position of different parts of the user's body over time in the image stream, generating information on the user's movements and general posture. The movement information of the user and/or the posture information of the user generated through image analysis can then be further analyzed, e.g., compared with reference information, to generate corrective information on if the user is performing the tasks correctly during the course of the videotelephony session. The posture information may be based on values of distances between and relative positions of different joints of a user.

In some examples, a first calibration step can be provided prior to beginning a videotelephony session, where video analysis may be performed to obtain reference values of the anatomy of the user at, e.g., a certain distance from the camera. For example, the user is prompted to stand straight, facing the camera, and image analysis of the image stream is performed to measure and store values for different portions of the anatomy of the user, such as lengths of segments between joints (e.g. of the chest, the upper arm; the forearm; the upper leg; the lower leg), and angles between the segments, or with reference to a frame of reference. The calibration anatomical values for the user may be stored as a data structure in memory, where the metadata indicates the user's information (e.g. name; age; weight; time when reference was taken in case user's anatomy varies over time, etc.). The calibration values may also be obtained through the user input its real-world measurements into the system, where the real-world measurements are then compared to the virtual measures taken in the image stream.

The user then performs certain tasks (e.g. exercises) during the course of the videotelephony session. The performance of these tasks is captured on the image stream by the camera used for panning and tilting (e.g. camera sensor 161 or pan/tilt camera 261).

For the purpose of providing feedback to the user regarding the carrying out of the tasks by the user, the user's posture information and change in posture information obtained through the image stream may be compared to reference data. Reference data may be obtained by measuring through video the anatomy of the reference (e.g. the instructor). The reference posture information can be calculated from the image stream as the reference is performing certain postures, and can also be based on the reference's real-world body measurements. The posture information, including virtual-measurements, angles between anatomical segments, conversions into real-time values, can be stored in memory as a reference data structure, associated with a given posture. When the user performs a given action during the videotelephony session, the user posture information is compared with the reference posture information to generate feedback to the user regarding improving of the user's posture when performing the given task.

The reference values for the user may then be used to determine if the user's posture is correct through the videotelephony session by comparing the posture information of the user to the reference values, where the relative positions of the joints may be calculated from the image stream using, e.g., depth information obtained from the camera, where each joint may be an image object that is tracked through the image stream to calculate the changes in the posture of the user.

Information may be generated on the display of the smartphone 150 indicative of if the user is performing the task correctly (e.g. has adopted the appropriate posture; is executing the exercise correctly), allowing the user to improve and learn during the course of the videotelephony session by implementing the generated feedback. The information may be a visual display such as a green check mark if the exercise is performed correctly, or a red "X" if not, or may be written or pictorial instructions provide the user with feedback on what to correct.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method for tracking a user during a videotelephony session initiated by a videotelephony application program running on a smartphone or tablet of the user placed in a holder configured to pan and tilt to adjust a field of view of a native camera of the smartphone or tablet, comprising:
   while a videotelephony session is running on the smartphone or tablet using the camera native to the smartphone or tablet, generating an image stream with a camera external from the smartphone or tablet, the external camera having at least an overlapping field of view to the field of view of the native camera of the smartphone or tablet;
   at least periodically performing image object analysis from the image stream generated by the external camera to track a position of the user within an image of the image stream; and
   generating at least one of a pan command and a tilt command to cause the holder, having received the smartphone or tablet, to pan and tilt, thereby causing the smartphone received in the holder to pan and tilt accordingly, in order to center the user in the field of view of the external camera to maintain the user within the field of view of the native camera during the videotelephony session despite the user physically moving around during the videotelephony session.

2. The method as defined in claim 1, wherein the external camera has a wired connection with the holder, and wherein the image stream produced by the external camera is transmitted to the holder via the wired connection.

3. The method as defined in claim 1, wherein the external camera has a wireless connection with the holder, and wherein the image stream produced by the external camera is transmitted to the holder via the wireless connection.

4. The method as defined in claim 1, wherein object tracking distinguishes a user object of the user from other moving objects in the image stream.

5. The method as defined in claim 1, wherein the external camera is attached to a frame of the smartphone or tablet.

6. The method as defined in claim 1, further comprising performing an analysis of the image stream of the external camera to identify a brightness of the image stream and adjust the brightness of the image stream to a set brightness.

7. The method as defined in claim 1, further comprising: prior to or at a start of the running of the videotelephony session, receiving a command from the smartphone or tablet for causing an actuator of the holder and the external camera to turn on.

8. The method as defined in claim 1, wherein the object analysis further identifies actions performed by the user captured in the image stream, and determines if the user actions corresponds to a reference action to provide the user with feedback on the user action.

9. The method as defined in claim 7, further comprising: receiving a command from the smartphone or tablet to cause at least one of the actuator of the holder to turn off and the external camera to turn off.

10. A method for tracking a user during a videotelephony session using a pan and tilt camera external from a smartphone or tablet such that the user is maintained within a field of view of the pan and tilt camera during the videotelephony session, comprising:
through an operating system for a smartphone or tablet stored in memory of the external pan and tilt camera, running a videotelephony application program stored in the memory of the pan and tilt camera, causing the pan and tilt camera to generate an image stream of a user appearing in the field of view of the pan and tilt camera;
mirroring, through a connection between the pan and tilt camera and the smartphone or tablet, the image stream generated by the pan and tilt camera onto the camera or smartphone of the user, wherein the mirrored image stream appears on a display of the smartphone or tablet of the user;
at least periodically performing image object analysis from the image stream generated by the external camera to track a position of the user within a frame of the image stream; and
generating at least one of a pan command and a tilt command to cause the pan and tilt camera to center the user in the field of view of the pan and tilt camera, such that the user is maintained in the field of view of the pan and tilt camera during the videotelephony session and in an image of the mirrored image stream appearing on the display of the smartphone or tablet.

11. The method as defined in claim 10, wherein the connection between the pan and tilt camera and the smartphone or tablet is a wireless connection.

12. The method as defined in claim 10, wherein the pan and tilt camera further comprises a zoom function, and further generating a zoom command, along with the generating at least one of a pan command and a tilt command, to cause the pan and tilt camera to center the user in the field of view of the pan and tilt camera.

13. The method as defined in claim 10, further comprising:
receiving, through the connection, user input provided by the user on the smartphone or tablet, for controlling the videotelephony application program; and
applying, through the mirroring, the user input on the videotelephony application program run by the operating system for a smartphone or tablet stored in memory of the pan and tilt camera, such that the videotelephony application program performs the one or more actions corresponding to the user input provided by the user on the smartphone or tablet.

14. The method as defined in claim 13, wherein the user input is for one or more of:
to show video;
to hide the video;
to update a background of the video; and
to change a resolution of the video.

15. The method as defined in claim 10, further comprising, prior to the running of the videotelephony application program stored in the memory of the pan and tilt camera, receiving a command from an external camera application program running on the smartphone or tablet to cause the videotelephony application program stored in the memory of the pan and tilt camera to begin to run through the operating system for a smartphone or tablet stored in memory of the pan and tilt camera.

16. The method as defined in claim 15, wherein the external camera application program running on the smartphone or tablet provides a user with a plurality of options of possible videotelephony application programs, wherein each of the videotelephony application program selections corresponds with a videotelephony application program stored in the memory of the pan and tilt camera, and wherein the command from an external camera application program running on the smartphone or tablet includes selection information corresponding to a selection by the user of the one of the plurality of possible videotelephony application program options.

17. The method as defined in claim 10, wherein the generating at least one of a pan command and a tilt command to cause the pan and tilt camera is performed by a processor of the pan and tilt camera, executing program code stored in the memory of the camera.

18. A system for tracking a user during a videotelephony session performed through a videotelephony application program running on a smartphone or tablet of the user, comprising:
a camera;
a fastener for fastening the camera to the tablet or smartphone in proximity to a native camera of the tablet or smartphone, such that the external camera has at least an overlapping field of view to a field of view of the native camera of the smartphone or tablet;
a holder for receiving and securing a smartphone or tablet comprising:
a receptacle portion for receiving and securing the smartphone or tablet, the receptacle portion adapted to pan and tilt;
an actuator for causing the receptacle portion to pan and tilt;
a processor;
memory;
program code stored in memory that, when executed by the processor, cause the processor to:
transmit a command to cause the camera to generate an image stream;
receive the image stream generated by the camera;
at least periodically perform image object analysis from the image stream generated from the camera to track a position of the user within a frame of the image stream;
generate at least one of a pan command and a tilt command to cause the holder to pan and tilt in order to center the user in the field of view of the camera; and
send the at least one of a pan command and a tilt command to the actuator, for causing the actuator to correspondingly at least one of pan and tilt the receptacle portion in order to center the user in the field of view of the external camera, thereby maintaining the user within the field of view of the native camera of the smartphone or tablet during the videotelephony session despite the user physically moving around during the videotelephony session.

* * * * *